Oct. 25, 1966     M. GREENBERG     3,281,597
INFRARED DEVICE FOR MEASURING STEAM QUALITY
Filed Sept. 23, 1965     3 Sheets-Sheet 1

INVENTOR.
MELVIN GREENBERG
BY
Vincent L. Carney
ATTORNEY

INVENTOR.
MELVIN GREENBERG

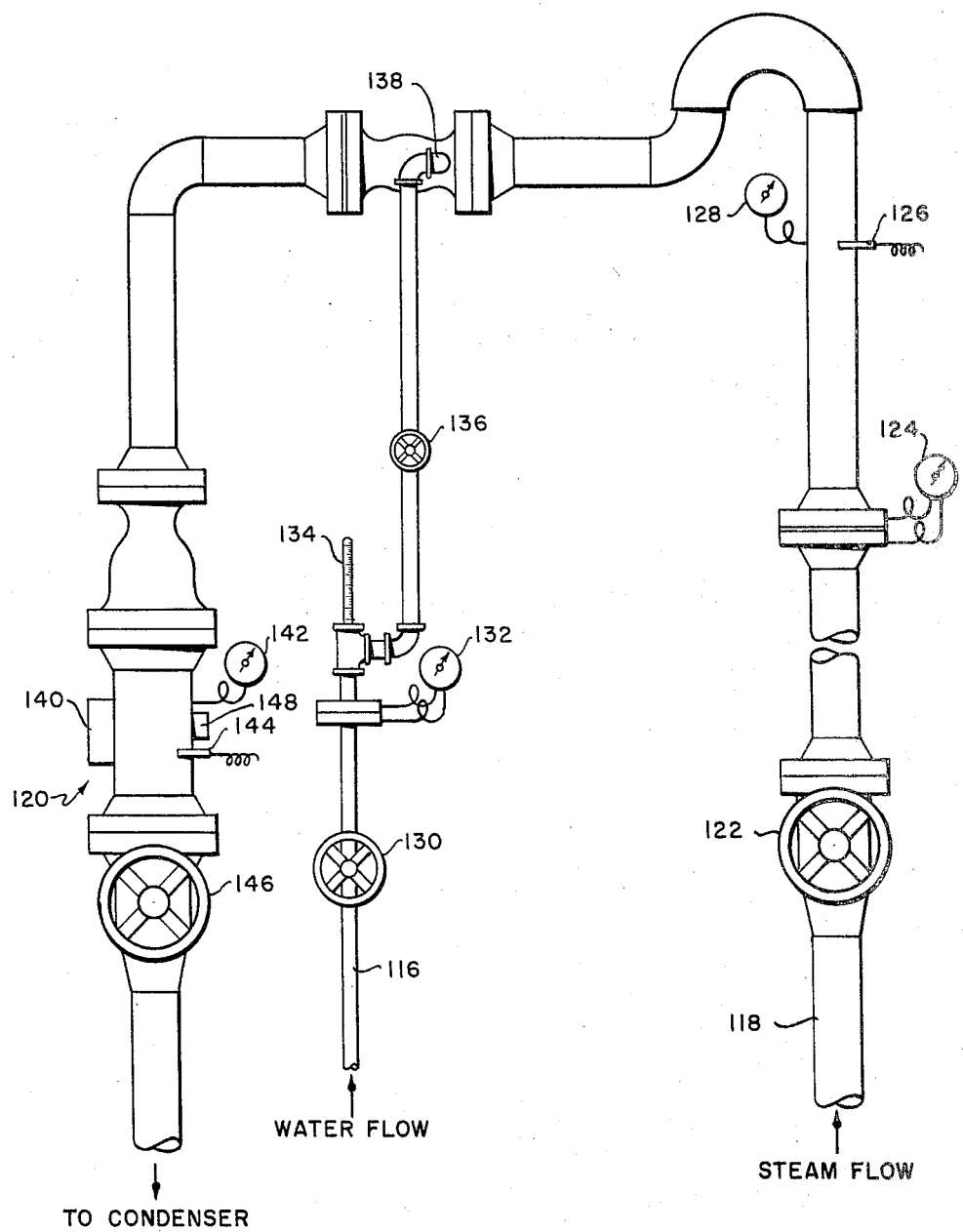

United States Patent Office

3,281,597
Patented Oct. 25, 1966

3,281,597
INFRARED DEVICE FOR MEASURING STEAM QUALITY
Melvin Greenberg, Annapolis, Md., assignor to the United States of America as represented by the Secretary of the Navy
Filed Sept. 23, 1965, Ser. No. 496,231
20 Claims. (Cl. 250—43.5)

The invention described herein may be manufactured and used by or for the Government of the United States of America for governmental purposes without the payment of any royalties thereon or therefor.

This is a continuation-in-part of applicant's co-pending application Serial No. 268,843, filed March 28, 1963.

This invention relates to a method and apparatus for analyzing steam and more particularly relates to a method and apparatus for determining the quality of steam continuously.

It is frequently desirable to determine the quality of steam or the amount of liquid water contained in the steam. The quality or wetness of steam is a factor in evaluating the efficiency of boilers. Wet steam is prone to cause erosion on the back and inlet edges of turbine blades, resulting in loss of efficiency and in the reduction of service life. The carry-over of solids contained in the boiler water is principally through the entrainment of these solids in water droplets suspended in the steam. Therefore, poor quality steam promotes the accumulation of solids in steam lines and associated equipment.

Steam quality takes on added importance for certain critical applications, such as the steam catapult, where successful operation hinges on the application of a predetermined thrust which, in turn, depends upon the usable energy in the steam. The amount of liquid water in the steam must be known in order to determine the usable energy available in such critical applications.

The existing devices for measuring steam quality such as the separating calorimeter and the throttling calorimeter require that the steam system be broken into and the steam sampled. The measurements of the samples of steam are integrated over the period of time and are not instantaneous or continuous. Also several manual operations are required, such as weight of water, the measuring of temperature and pressure, and the adjusting of flows. The accuracy of these devices is poor and their application is limited to a narrow range of quality and pressures. Accordingly, it is an object of this invention to provide a method and apparatus for accurately measuring the quality of steam.

It is a further object to provide a method and apparatus for continuously and automatically measuring steam quality without interruptedly sampling the steam or obstructing its flow.

It is a still further object of this invention to provide an apparatus which will measure the quality of steam over a quality range of 50% to 100%.

It is a still further object to provide a method and apparatus for measuring the quality of steam over a pressure range of 0 to 5000 p.s.i.g. (pounds per square inch gage) and which will operate successfully over a wide range of mass steam flow conditions.

It is another object of this invention to provide a method and an apparatus for measuring the quality of steam over a temperature range of 212° Fahrenheit to 1500° Fahrenheit and which will operate successfully over a wide range of mass steam flow conditions.

It is a still further object to provide apparatus for measuring the quality of steam which has an instantaneous read-out when necessary and which will withstand shock and vibration conditions which may occur during shipboard use.

Other objects and many of the attendant advantages of this invention will be readily appreciated as the same becomes better understood by reference to the following detailed description when considered in connection with the accompanying drawings wherein:

FIG. 4 is a diagram of apparatus used to calibrate the illustrative embodiment of the invention.

Figure 1:
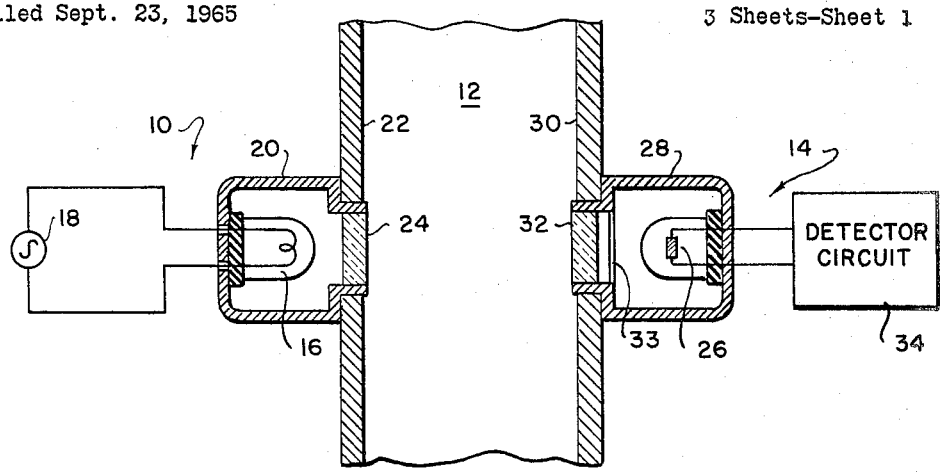
FIG. 1 is a cross-sectional view of an illustrative embodiment of apparatus which may be used in this invention.

Referring now particularly to FIG. 1, a cross-sectional view of an infrared steam quality analyzer, which is an embodiment of this invention for use on steam systems carrying up to 2,000,000 lbs. per hour of steam or more is shown having a source of infrared radiation 10 mounted on a steam conduit 12 so as to radiate infrared light into the steam conduit 12 and a means 14 for measuring the amount of infrared light which crosses the steam conduit 12. The source of light 10 includes a lamp 16 energized by a source of current 18 and mounted in housing 20. The housing 20 is mounted on the wall 22 of the conduit 12. Openings in both the housing 20 and the wall 22 of the conduit 12 are placed side by side so that light emitted by the lamp 16 may pass into the conduit 12. The opening is sealed by the quartz lens 24. A photoconductive element 26 is mounted in a housing 28 located on the wall 30 of the conduit 12 in a position directly opposite to the light source 10. The housing 28 and the wall 30 of the conduit 12 have adjacent and coaxial openings sealed by quartz lens 32 which is parallel to the quartz lens 24 and diametrically opposite to it so that the steam confined by the conduit 12 must pass between the two quartz lenses. The light from lamp 16 passes through lens 24, conduit 12, and lens 32, and infrared transmitting filter 33 before impinging on the photoconductive element 26. A detector circuit 34 is connected across photoconductive element 26 so as to measure the resistance of this element. Steam passing through the conduit 12 between lens 24 and lens 32 attenuates infrared radiation in varying amounts, depending upon its wetness.

According to the invention the instrument developed is designed to measure the total infrared attenuation of wet steam. Wet steam consists of water vapor and liquid water droplets. It has been reported in the literature that water in both of these forms attenuates near infrared radiation. Attenuation by water vapor is through the process of simple absorption and is affected only by the concentration of water molecules and the path length traversed by the radiation. This is mathematically expressed by the Beer-Lambert equation:

$$A = \log I_0/I = axbxc \qquad (1)$$

where $A$ = absorbance
$a$ = absorption coefficient
$b$ = path length traversed by the radiation
$c$ = concentration of absorbing molecules
$I_0$ = incident radiation
$I$ = transmitted radiation The path length ($b$) is fixed by the diameter of the sample section of the instrument and the concentration of water vapor molecules ($c$) is directly related to the steam pressures. The attenuation due to the water vapor has been empirically determined by measurements on dry superheated steam at various pressures. It is constant at any specified pressure and it is included in the calibration of the instrument.

The remaining infrared attenuating processes are the complex absorption which occurs in spherical water droplets as a result of multiple internal reflection and the scattering of the incident radiation by the small water droplets. These processes are the major infrared attenuating mechanisms and are both related to the particle size distribution and concentration of liquid water particles in the steam.

It has been found that infrared transmission is not significantly affected by changes in mass steam flow rate above a limiting value and by other operating conditions such as temperature and pressure after a correction for water vapor absorption has been applied. Therefore, it is reasoned that the water droplet size distribution for a steam system is a constant characteristic over a wide range of operating conditions and that the concentration of water droplets is the only variable related to the infrared attenuating properties of the steam. Steam quality being directly related to the concentration of water particles should be related to the instrument's reading. Actual measurements made on wet steams over a wide range of qualities show this to be true.

The steam quality analyzer has been designed to operate in the 1 to 3 micron region of the electro-magnetic spectrum, known as the near-infrared region. This region has been selected because of the intense attenuation of radiation by wet steam in this region and because of the availability of sensitive detectors, steam resistant infrared-transmitting materials, and infrared sources which operate efficiently in this region. Radiation attenuating bands occur at 2.97, 1.98, 1.46, 1.18, and 0.98 microns. The intensity of these bands decreases with decreasing wavelength. The 2.97-micron band is by far the strongest absorption band and is a result of the fundamental vibrational mode of the water molecule. The other absorption bands are due to combination and harmonic frequencies of the fundamental vibrations.

Figure 2:
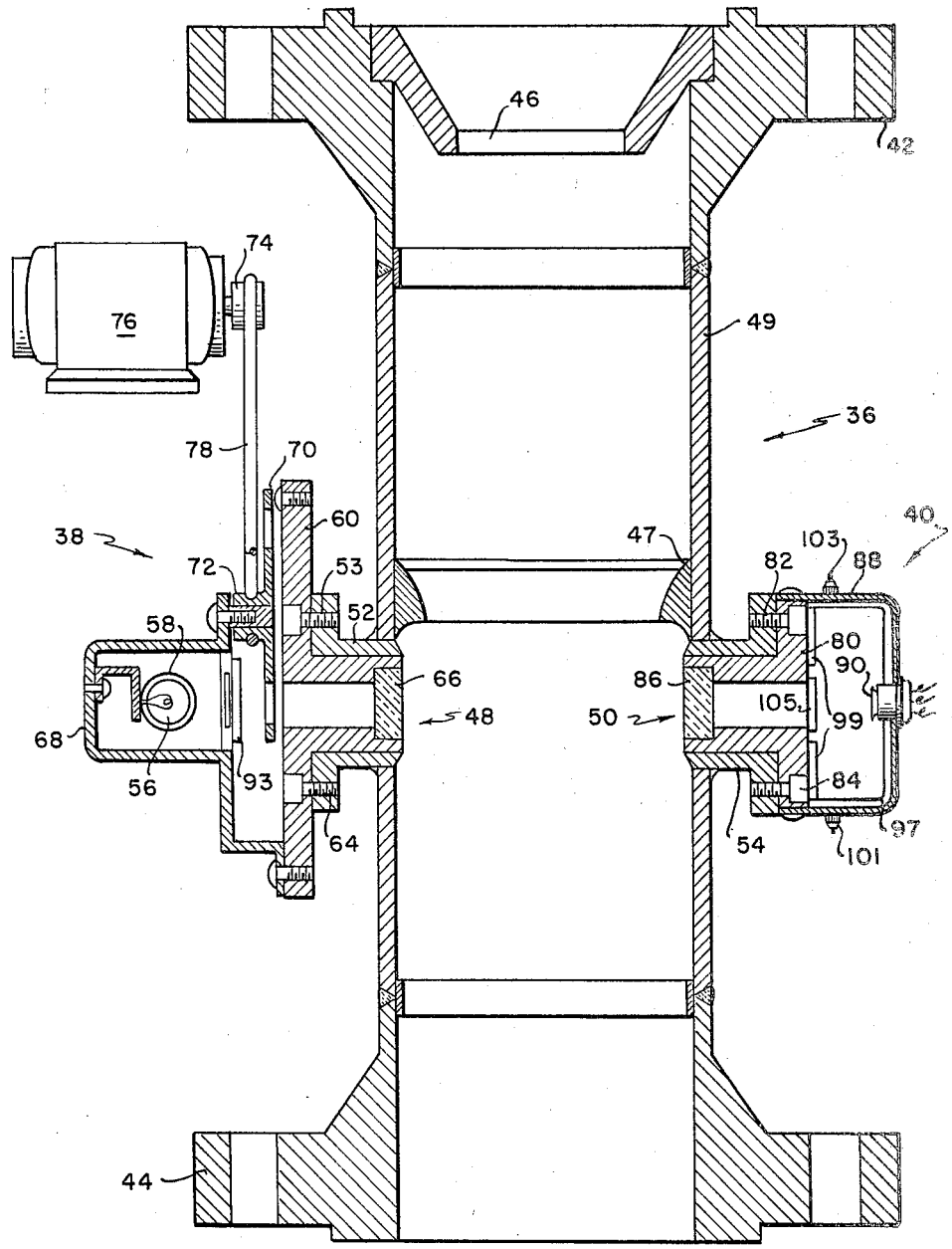
FIG. 2 is a cross-sectional view of the same illustrative embodiment of the invention shown in more detail.

FIG. 2 is a more detailed cross-sectional view of the embodiment of the invention having a sample section of pipe 36 for receiving the steam, an infrared source section 38 and a detecting section 40.

The sample section is a two-foot-long section of six-inch-diameter stainless steel pipe 49, through which the full steam flow may pass unobstructed. Flanges 42 and 44 at each end of the pipe permit installation and removal from a steam system. The unit 95 shown is designed to operate in a vertical run of piping. Cylindrical constrictions 46 and 47 are mounted inside of the pipe 49 so as to form inner rings within the pipe for reasons which will become evident hereafter. Two cylindrical openings 48 and 50 are in the pipe wall in the center of the sampling section 36. A flange 52 is welded to the hole 48 and a flange 54 is welded to the pipe around the hole 50. The holes are diametrically across from each other and coaxially located so as to form a line of sight through the interior of the pipe 49. The steam which is being analyzed flows from top to bottom of the sampling section 36. Its velocity is increased by the constriction 46 at the top of the pipe and by the constriction 47 at the midportion of the pipe so as to prevent settling out of water particles before the steam passes through the measuring portion between the holes 48 and 50 in the center of the sampling section.

The source section 38 comprises a tungsten filament 56 mounted within the quartz bulb 58 comprising a minature lamp rated at 150 watts at an operating voltage of 28 volts. The lamp is operated at 12 volts which extends its rated life and moves the peak of its spectral energy distribution curve to 0.9 micron in the near infrared region. The tungsten lamp emits continuous band radiation covering the visible and near infrared regions to 3.5 microns, which is the cut-off wave length for the quartz bulb 58.

A steel flange 60 having a cylindrical portion which slides inside of flange 52 and a lip through which bolts 53 and 64 pass to fasten the flange 60 to the flange 52 is mounted in the light source end of the sample section 36. A quartz lens 66 is inserted in one end of the flange 60 so as to seal the opening from the pipe 40. An aluminum housing 68 in the shape of a box with a flange on one end is mounted outside of the steel flange 60 and bolted to it by a flange. The infrared bulb 58 containing tungsten filament 56 is mounted inside of this box so as to radiate through aperture 48 into the pipe 49. An adjustable shutter 93 for adjusting the intensity of the infrared radiation entering into the pipe 49 and a track 93a to permit the introduction of filters of known transmission values for standardization purposes are located in front of the source housing 68. An optical beam interrupter 70, in the form of a metal disk having holes which coincide with the hole 48, is mounted on sleeve pulley-bearing assembly 72 and driven by pulley 74. A synchronous motor 76 drives pulley 74 so as to rotate the belt 78 which looped around the pulley-bearing assembly 72.

Infrared light from the tungsten filament 56 radiates through the hole 48, into the pipe 36 of the sampling section, across its diameter, and into the opening 50 to the detector. The optical beam interrupter 70 is driven by the synchronous motor 76 at 1800 r.p.m. (revolutions per minute). There are 6 equal spaced holes along the rim of the disk of the optical interrupter so that the infrared light from the filament 56 will be interrupted at a rate of 180 cycles per second.

A detector section 40 consists of cylindrical flange 80 having a main cylindrical portion which slides inside of steel flange 54 and a lip which may be bolted to the lip of the steel flange 54 by bolts 82 and 84. Quartz lens 86 is mounted in the cylindrical portion of the flange 80 so as to seal the opening 50 of the pipe 49. A cylindrical Monel housing 88 is bolted to the cylindrical flange 80. The inside housing 88 has a cavity 97 through which cooling water circulates. Cut out sections 99 are provided on the detector housing 88 to reduce the conductive heat transfer from flange 80. Cooling water inlet 101 and outlet 103 are provided. An infrared transmitting filter 105 through which visible light cannot travel is located at the entrance to the detector housing 88. Photoconductive detector 90 is mounted in the center of the Monel housing 88 and is in line with the opening 50 in the wall of the pipe 49.

Continuous infrared radiations from the light source 56 are interrupted 180 times per second by the rotating disk 70 and enters the opening 48, crosses the diameter of the pipe through the steam, and enters the opening 50 of the detector housing 88. These bursts of infrared radiation are converted to electrical impulses by the photoconductive device 90. The amount of radiation which passes through the steam in the sampling section 36 is indicative of the amount of water contained in the steam.

Figure 3:
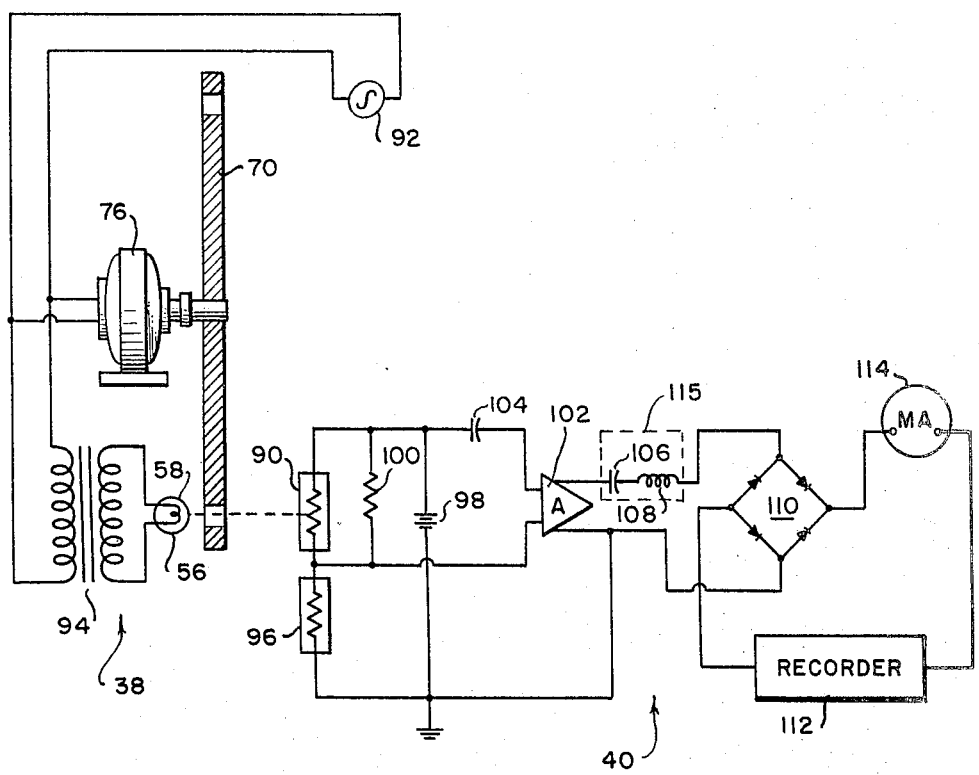
FIG. 3 is a schematic circuit diagram of the same illustrative embodiment of the invention.

The schematic circuit diagram of the illustrative embodiment of this invention is shown in FIG. 3 having a light source 56 and a detector portion 90. A source of alternating power 92 drives the synchronous motor 76 at 1800 r.p.m. The primary of the step down transformer 94 is also electrically connected across the source of alternating power 92 in parallel with the synchronous motor 76. The step down transformer 94 provides an output voltage in the secondary windings of 12 volts. The infrared light bulb 56 is energized by the secondary coils of the step down transformer 94. An optical interrupter 70 is driven by the synchronous motor 76. The optical interrupter is in the form of a metal disk with openings which passes in front of the light bulb 56 and which contains six evenly spaced holes along its rim at the same distance from its shaft as the infrared light bulb 56 so that the light may pass through the optical interrupter six times in each of its revolutions.

A photoconductive element 90 is mounted on the opposite side of the steam and in line with the holes to the optical interrupter 70 and the infrared light bulb 56 so as to receive bursts of infrared radiation after they have passed through the steam. A second photoconductive element 96 which is similar to and of the same type and design and having the same thermal coefficient of resistance as the photoconductive element 90 is connected in series with it and is encapsulated so as to shield it from light. The second photoconductive element 90 serves as a temperature drift compensation device which will be explained hereafter. A bias voltage of 45 volts from the D.C. voltage source 98 is connected across the series combination of the photoconductive elements 90 and 96. A resistor 100 is connected across the photoconductive element 90. A high-stability A.C. amplifier 102 is connected parallel to photoconductive element 90 and resistor 100 through coupling condenser 104. The output from the amplifier 102 is connected to the frequency tuned narrow band filter 115 which is comprised of condenser 106 in series with inductor 108. The full-wave rectifier bridge 110 is connected to the output of the tuned filter. A recorder 112 and a milliammeter 114 are connected in series to the output of the full-wave bridge rectifier 110 so as to measure the final D.C. output voltage of the detector section.

The resistive value of photo conductive elements 90 and 96 vary in the same way and in the same amount and direction with temperature changes. Because of this the relative resistive values of photo conductive elements 90 and 96 are always the same and the voltage drop across the photo conductive elements 90 and 96 are always constant in the absence of any infrared radiation with changes in the ambient temperature.

The resistance of the photoconductor 90 is modulated at a rate of 180 cycles per second by the infrared light from the lamp 56. This causes an A.C. voltage of 180 cycles per second to be conducted to the input of the A.C. amplifier 102 whose A.C. voltage output is inversely proportional to the amount of light absorbed by the steam flowing through the measuring device. D.C. voltage components are blocked from the input of the amplifier 102 by the condenser 104. The bleeder resistor 100 prevents the build up of D.C. voltages on condenser 104. Some of the electrical noise from the amplified output of the A.C. amplifier 102 is removed by the frequency tuned narrow-band filter 115 which is comprised of the capacitor 106 and the inductor 108. In addition electrical signals from the detector other than 180 c.p.s. modulated signals will be rejected by the filter 115. The full wave rectifier bridge 110 converts the 180 cycle per second output from this filter to a D.C. output which is also inversely proportional to the amount of light that is absorbed by the steam. This D.C. voltage is measured by the milliammeter 114 and recorded by the recording device 112.

In order to make the necessary measurement properly, the infrared steam analyzer must first be calibrated. A calibrating system is shown in schematic form in FIG. 4. In this system water from conduit 116 is mixed with dry steam from conduit 118 in known proportions and the infrared steam analyzer unit 120 is calibrated in terms of known steam and water. A steam pressure reducing valve 122 controls the steam pressure from conduit 118.

The steam flow is measured by a steam orifice flow meter 124 mounted in the conduit just beyond the steam pressure reducing valve 122. Thermocouple 126, mounted in the steam conduit 118 just beyond the steam orifice flow meter 124, measures the temperature of the steam and pressure gage 128 located at the same point measures the pressure of the steam. Water flow is controlled by a valve 130 mounted just beyond the source of water. A water-flow orifice water meter 132 mounted in the conduit 116 just beyond the valve 130 measures the amount of water flow and mercury-in-glass thermometer 134 mounted near the same point measures the temperature of the water. A more sensitive valve 136 is mounted beyond the temperature measuring thermometer and the water-flow orifice water meter. Beyond the valve 136 the water conduit has a water spray nozzle 138 mounted within the steam conduit 118 downstream of the thermocouple 126 and pressure gage 128 of the steam conduit. In this way a known amount of water at measured temperature may be added to steam of known pressure, temperature, and flow rate. The mixture then flows along the conduit to the measuring-instrument section 120. The measuring-section has the infrared source section 140, the detector section 148, a pressure meter 142, and a thermocouple 144 to make the necessary measurements for calibration purposes. Beyond the instrument and the steam conduit a throttling valve 146 is located, followed by a condenser, condensate pump, and weight tank.

The calculation of steam quality for the calibrating steam system shown in FIG. 4 is based on a heat balance of the system. That is, the heat content in (via the superheated steam and hot water) is equal to the heat content out (via the wet steam).

The following experimental data are determined:

(1) Flow rate of superheated steam (SF) in lb. per hr.
(2) Flow rate of water (WF) in lb. per hr.
(3) Temperature of superheated steam ($Ts$) in degrees F.
(4) Temperature of water ($Tw$) in degrees F.
(5) Pressure of superheated steam ($Ps$) in p.s.i.g.
(6) Pressure of wet steam mixture ($Pm$) in p.s.i.g.

The ratio (R) of water to superheated steam is calculated from Equation 4.

$$R = \frac{WF}{SF} \quad (4)$$

The enthalpy of the superheated steam ($Hs$ in B.t.u. per lb.) is found in the steam tables, using the temperature ($Ts$) and pressure ($Ps$) experimentally determined. The enthalpy of the water ($Hw$ in B.t.u. per lb.) is also found in the steam tables, using the temperature ($Tw$) experimentally determined. The enthalpy of the wet steam mixture ($Hm$ in B.t.u. per lb.) is then calculated from Equation 5.

$$Hm = \frac{Hs + RHw}{1 + R} \quad (5)$$

The percent wetness of the steam mixture is then found on a Mollier steam chart, using the calculated enthalpy ($Hm$) from Equation 5 and the experimentally determined pressure ($Pm$). Since the sum of percent quality and percent wetness equals 100, the percent quality is also arrived at.

Obviously many modifications and variations of the present invention are possible in the light of the above teachings. It is therefore to be understood that within the scope of the appended claims the invention may be practiced otherwise than as specifically described.

What is claimed is:

1. The method of measuring the quality of unobstructed flowing steam having a pressure range of from 0 to 5000 pounds per square inch gauge and a temperature range of from 212° to at least 1500° Fahrenheit comprising the steps of:

determining, for calibration, at given flow rates the radiation attenuation characteristics of dry steam having a pressure range of from 0 to 5000 pounds per square inch gauge and a temperature range of from 212° to at least 1500° Fahrenheit;

passing at a known flow rate a stream of wet steam having a pressure range of from 0 to 5000 pounds per square inch gauge and a temperature range of from 212° to 1500° Fahrenheit, the quality of which is to be determined, thru a path of radiation essentially identical to the radiation employed for calibration; and comparing the radiation attenuation characteristics of the wet steam undergoing quality determination with the radiation attenuation characteristics of the dry steam calibrated at a similar flow rate, whereby there is obtained the attenuation caused by water droplets content of the steam which corresponds to the steam quality.

2. A method of measuring the quality of test steam comprising the steps of:
- mixing a stream of dry steam having a known flow rate with a stream of water having a known flow rate;
- generating near infrared radiation;
- focusing said near infrared radiation into a beam;
- directing said beam of near infrared radiation on said mixture of dry steam and water;
- measuring the amount of near infrared radiation that passes through said stream;
- directing said beam of near infrared radiation on said test steam;
- measuring the amount of near infrared radiation that passes through said test steam; and
- comparing said amount of near infrared radiation that passed through said test steam with said amount of radiation that passed through said mixture of steam and water of known proportions.

3. Apparatus for measuring the quality of wet steam, said wet steam being constituted of water vapor and water droplets both of which have the characteristic of attenuating radiation including infrared radiation to which the wet steam may be exposed, the degree of radiation attenuation due only to water vapor having been previously empirically determined, said apparatus comprising:
- a pipe containing the flowing wet steam to be measured;
- means mounted in said pipe for increasing the velocity of said wet steam;
- a source of radiation including infrared radiation for transmitting the radiation transversely thru the pipe;
- radiation detecting means located on said pipe to receive the transmitted radiation, whereby when wet steam is passed thru the pipe the output of said detecting means represents the total attenuation caused by water vapor and water droplets; and
- means for comparing the total attenuation with the attenuation caused only by the water vapor for producing an output corresponding to radiation attenuation caused only by the water droplets according to water droplet concentration;
- the amount of attenuation caused by the water-droplets being related to steam quality.

4. Apparatus according to claim 3 wherein said comparison means comprises instrumentation read out means calibrated to compensate for radiation attenuation due to water vapor.

5. Apparatus according to claim 3 wherein said radiation detecting means comprises photon sensitive means.

6. Apparatus according to claim 3 wherein said means mounted in said pipe for increasing the velocity of said wet steam comprises a constricted ring portion in said pipe which prevents the accumulation in said pipe of any water droplets contained in said water.

7. Apparatus for measuring the quality of wet steam, said wet steam being constituted of water vapor and water droplets both of which have the characteristic of attenuating radiation including infrared radiation to which the wet steam may be exposed, the degree of radiation attenuation due only to water vapor having been previously empirically determined, said apparatus comprising:
- a pipe containing the flowing wet steam to be measured;
- means mounted in said pipe for preventing the accumulation of water droplets in said pipe;
- a source of radiation including infrared radiation for transmitting the radiation transversely thru the pipe;
- radiation detecting means located on said pipe to receive the transmitted radiation, whereby when wet steam is passed thru the pipe the output of said detecting means represents the total attenuation caused by water vapor and water droplets; and
- means for comparing the total attenuation with the attenuation caused only by the water vapor for producing an output corresponding to radiation attenuation caused only by the water droplets according to water droplet concentration;
- the amount of attenuation caused by the water-droplets being related to steam quality.

8. Apparatus according to claim 5 wherein said photon sensitive means is housed in a water cooled housing.

9. Apparatus according to claim 5 wherein said photon sensitive means is provided with a temperature drift compensating means.

10. Apparatus for measuring the amount of liquid water suspended in steam said steam comprising water vapor;
- a housing for containing said steam;
- means for generating steam;
- means connecting said steam generating means to said housing;
- a first quartz window removably mounted on one side of said housing;
- a second quartz window removably mounted on the side of said housing and aligned with said first quartz window such that a beam of infrared light can pass through both of said first and said second quartz windows;
- light means, mounted outside of said housing means, for generating a beam of near infrared light and directing said beam of near infrared light through said first quartz window into said housing means and through said second quartz window to the outside of said housing means, interrupter means mounted between said light means and said housing means, for periodically interrupting said beam of near infrared light at a predetermined rate;
- detector means mounted in the path of said beam of light after it passes through said second quartz window, for converting said beam of light to electrical impulses which vary at said predetermined rate of said interrupter means;
- means for passing said near infrared light only and excluding visible light mounted in the path of said beam of light between said detector means and said second quartz window;
- filter means, electrically connected to said detector means, for passing only said electrical impulses which vary at said predetermined rate; and
- measuring means, electrically connected to said filter means, for measuring the amplitude of said electrical impulses; whereby said amount of water suspended in said vapor may be determined.

11. Apparatus according to claim 10 wherein said detector means comprises:
- a pair of photo conductive elements one of which is encapsulated and forms a compensator for temperature drift of said detector means.

12. Apparatus according to claim 11, wherein said detector means is mounted in a water cooled housing.

13. Apparatus according to claim 10 wherein said detector means is mounted in a water cooled housing.

14. Apparatus according to claim 13 wherein said steam is continously flowing and said housing contains means for increasing the velocity of said steam for preventing the accumulation in said housing of any water droplets contained in said steam.

15. Apparatus according to claim 10 wherein said steam is continuously flowing and said housing contains means for increasing the velocity of said steam for preventing the accumulation in said housing of any water droplets contained in said steam.

16. Apparatus for measuring the quality of wet steam being constituted of water vapor and water droplets both of which have the characteristic of attenuating infrared radiation to which the wet steam may be exposed, the degree of radiation attenuation due only to water vapor having been previously determined, said apparatus comprising:
- a housing containing the flowing wet steam to be measured;
- means for generating wet steam;
- means connecting said wet steam generating means to said housing;
- a source of infrared radiation for transmitting the radiation transversely through said housing;
- radiation detecting means located on said housing to receive said transmitted radiation, whereby when wet steam is passed through said housing the output of said detecting means represents the total attenuation caused by said water vapor and said water droplets; and
- means for comparing the total attenuation caused by the water droplets and the water vapor combined with the attenuation caused only by the water vapor for producing an output corresponding to radiation attenuation caused only by the water droplets according to water droplet concentration whereby the amount of attenuation caused by said water droplets is related to said steam quality.

17. Apparatus for determining the amount of liquid water in a water vapor atmosphere in which the degree of infrared radiation attenuation due to water vapor having been previously determined comprising:
- a conduit for conducting a flowing fluid, said fluid comprising a mixture of liquid water suspended in a water vapor atmosphere;
- means for generating a mixture of liquid water suspended in water vapor connected to said conduit;
- a source of infrared radiation for transmitting said infrared radiation transversely through said conduit mounted on said conduit, said infrared radiation being attenuated by said water droplets and said water vapor;
- radiation detecting means located on said conduit to receive said transmitted radiation, whereby when liquid water suspended in water vapor and passed through said conduit, the output of said detecting means represents the total attenuation caused by said liquid water and said water vapor; and
- means for comparing said total attenuation caused by said liquid water and said water vapor with the attenuation caused only by the water vapor for producing an output corresponding to radiation attenuation caused only by said liquid water.

18. Apparatus according to claim 17 wherein said conduit contains means mounted therein for preventing the accumulation of water droplets in said conduit.

19. Apparatus according to claim 16 wherein said housing contains means mounted therein for preventing the accumulation of water droplets in said housing.

20. Apparatus for measuring the amount of liquid water droplets in a water vapor atmosphere comprising:
- a pipe having a longitudinal axis;
- means for generating a mixture of liquid water droplets suspended in a substantially pure water vapor atmosphere connected to said pipe, said mixture moving along said longitudinal axis of said pipe;
- a source of infrared radiation for transmitting said radiation transversely through said pipe mounted on a diameter of said pipe, said radiation being attenuated by said liquid water droplets and said water vapor;
- infrared radiation detecting means located on said diameter of said pipe to receive said transmitted radiation;
- means responsive to the output of the radiation detection means for indicating the amount of liquid water droplets present in said water vapor whereby the quality of the water vapor atmosphere may be ascertained.

References Cited by the Examiner
UNITED STATES PATENTS

| | | | |
|---|---|---|---|
| 2,621,297 | 12/1952 | Obermaier | 250—43.5 |
| 2,674,696 | 4/1954 | Smith et al. | 250—43.5 |
| 2,742,550 | 4/1956 | Jenness | 250—83.3 |
| 2,953,681 | 9/1960 | Frazier | 250—43.5 |
| 3,082,340 | 3/1963 | Schneeberger | 250—83.3 |
| 3,194,962 | 7/1965 | Carlson et al. | 250—43.5 |

RALPH G. NILSON, *Primary Examiner.*

A. L. BIRCH, *Assistant Examiner.*